United States Patent [19]

Streicher et al.

[11] 4,276,859
[45] Jul. 7, 1981

[54] PRESSURE LUBRICATION FOR INTERNAL COMBUSTION ENGINES

[75] Inventors: Kurt Streicher, Heppenheim; Achim zur Nieden, Cologne, both of Fed. Rep. of Germany

[73] Assignee: Klöckner-Humboldt-Deutz Aktiengesellschaft, Cologne, Fed. Rep. of Germany

[21] Appl. No.: 112,648

[22] Filed: Jan. 16, 1980

[30] Foreign Application Priority Data

May 22, 1975 [DE] Fed. Rep. of Germany 2522605

Related U.S. Application Data

[62] Division of Ser. No. 685,752, May 13, 1976.

[51] Int. Cl.³ .............................................. F01M 1/00
[52] U.S. Cl. ................................. 123/196 R; 184/6.24; 210/416.5
[58] Field of Search ............... 123/196 A; 184/6.24, 184/7 R, 6.2; 210/416 L, 416 F, 168

[56] References Cited

FOREIGN PATENT DOCUMENTS

| 1203053 | 1/1960 | Fed. Rep. of Germany | 184/6.24 |
| 1093142 | 11/1960 | Fed. Rep. of Germany | 184/6.24 |
| 1113610 | 9/1961 | Fed. Rep. of Germany | 123/196 A |
| 2306662 | 8/1974 | Fed. Rep. of Germany | 123/196 A |

OTHER PUBLICATIONS

A. Scheiterlein, Der Aufbau der raschlaufenden, Verbrennungskraftmaschinen 1964.

Primary Examiner—Ronald H. Lazarus
Attorney, Agent, or Firm—Becker & Becker, Inc.

[57] ABSTRACT

A pressure lubrication system for an internal combustion engine, according to which lubricating oil is drawn out of an oil pan by means of an oil pump through a suction conduit which has an intake funnel and a filter. The intake funnel has an inner maximum diameter of about five times that of the cross section of the suction conduit. At its inlet opening, the intake funnel takes the shape of a circular, flat disc located in or parallel to the plane of the inlet opening.

2 Claims, 2 Drawing Figures

PRESSURE LUBRICATION FOR INTERNAL COMBUSTION ENGINES

This is a division of co-pending parent application Ser. No. 685,752—Streicher et al filed May 13, 1976.

The present invention relates to an internal combustion engine having pressure lubrication, according to which lubricating oil is drawn or sucked out of an oil pan by means of an oil pump through a suction conduit with an intake funnel and a filter.

With internal combustion engines, which are installed in vehicles and construction machines, the requirements which have to be met with regard to longer operating periods in inclined positions become increasingly greater. With regard to such requirements, the lubricating oil system must be designed in such a way that in occurring inclined positions the suction conduit of the oil pump must always remain below the respective oil level. It is known ("Der Aufbau der raschlaufenden Verbrennungskraftmaschinen" by A. Scheiterlein, Wien, Springer-Verlag, 1964, page 346) to make a sump particularly deep in the middle section of the oil pan and to obtain the desired greater possible incline by means of increased oil filling. A drawback inherent to this arrangement consists in the larger overall height of the engine, which in most cases reduces the ground clearance of the vehicle or increases the installation space of construction machines to an undesired extent.

Heretofore known designs of dry sump lubrications imply a considerably higher cost of construction. Such cost of construction does not justify the greater obtainable inclined position.

Because for flow technical reasons, in order to realize a favorable intake, the intake funnel of the suction conduit is made about ten times larger than the cross section of the suction conduit (Scheiterlein, page 97, para.2, lines 4,5). A likewise very large intake funnel having a trumpet shaped guiding surface, which together with the intake funnel forms an annular gap, is disclosed in German Pat. No. 638,900. The drawback of these known designs consists in the larger diameter of the funnel which, during the slightest emerging from the oil bath, draws in air so that an air-oil mixture is conveyed. In this way, within a short period of time, the circulating oil becomes increasingly foamy, so that bearing damage results from poor lubrication.

It is an object of the present invention so to design the suction conduit with intake funnel that as great an incline of the engine will be possible without air being drawn in.

This object and other objects and advantages of the present invention will appear more clearly from the following specification in connection with the accompanying drawing in which.

The present invention is characterized primarily in that the intake has an inside largest cross section of about five times that of the suction conduit cross section and that, at its inlet opening, the intake changes into a circular, flat disc, which is arranged in or parallel to the plane of the inlet opening. The materially reduced diameter of the inlet opening emerges out of the oil level only in larger inclined positions of the engine. The inlet flow, which first appears to be unfavorable in view of the smaller funnel diameter, is substantially counter balanced at the level of the inlet opening by the effect of the flat disc without drawing in air, as it occurs with the customary or commonly used large intake. The favorable effect of the disc becomes evident primarily at a low oil level in a horizontal position. With this operating condition, no air is drawn in whereas air is drawn in with conventional intakes.

A further improvement of the stream or flow during its entry into the intake funnel is realized by connecting the intake funnel with an inversely arranged second funnel. The second funnel reduces the intake cross section to approximately that of the suction or intake conduit and supports the disc in the plane of the inlet opening. With this design not only is a larger incline achieved by means of the smaller inlet or intake cross section, but a drawing in of air is also avoided by the favorable effect of the disc upon the flow in the area of the inlet opening. At the same time, the disc acts as a wave breaker when the oil level is agitated, so that even a momentary emerging of the inlet opening from the oil bath and thus a momentary drawing in of air at said inlet opening is avoided.

An especially favorable form of the intake in combination with the second inversely arranged funnel connected thereto is realized when the circular, flat disc corresponds approximately to the largest diameter of the intake funnel. Very small and compact dimensions are thus obtained. At the same time, the disc brings about especially favorable flow conditions up to extreme inclined positions of the inlet funnel with regard to the oil level. As a result thereof, with a low oil level up to close to the intake opening, no air is drawn in. Particularly favorable dimensions of the intake funnel are obtained when the cone angle formed by the mantle surfaces of the intake funnel is less than 90°.

Figure 1:
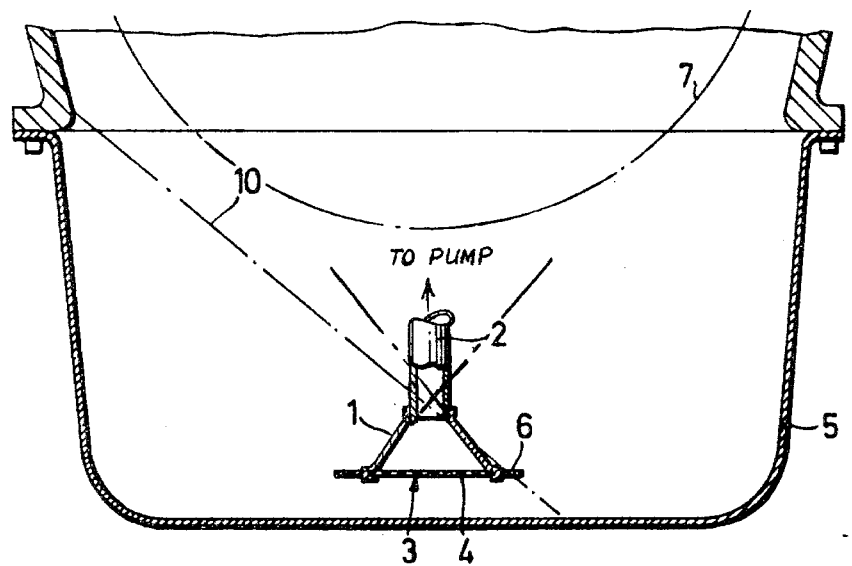
FIG. 1 shows in section a first embodiment of the pressure lubricating system according to the invention.

Referring now to the drawing in detail, FIG. 1 shows a section through an intake funnel 1 of a suction conduit 2, which leads to an oil pump (not shown). The opening 3 of the intake funnel 1 is capped in a known way with a filter 4 in order to prevent the absorption of coarse impurities and foreign matter. The intake funnel 1 is located in the sump of the oil pan 5. As an example of a possible incline which may occur during operation, the oil level corresponding thereto is shown as the dot-dash line 10. The largest possible incline for internal combustion engines, which are constructed as an upright design, is obtained on one hand by the emergence of the intake funnel 1 or by the drawing in of the oil-air mixture and on the other hand by the displacement of the oil level nearly to the enveloping curve 7 which is formed by the large rotating connecting rod eye. An adequate spacing or clearance from this enveloping curve 7 is necessary, so that the cranks do not immerse in the oil bath and further increase or raise the foaming of the oil. The limit of the inclined position is usually obtained by the emergence of the diameter of the intake funnel. According to the present invention, the diameter of the intake funnel 1 is made materially smaller than usual and is equipped with a circular, flat disc 6 to improve the flow at the level of the opening 3 of the intake funnel 1.

As indicated by the dot-dash lines of the oil level, the materially smaller opening of the intake funnel 1 allows larger inclines than an intake funnel with a larger opening. The flow conditions are particularly favorably influenced by the disc 6 as the stream flows into the opening 3 of the intake funnel, so that with inclines nearly to the opening 3 of the intake funnel, no air is carried forward and thereby no foaming of the lubricating oil occurs. With a parallel but very shallow oil level, the flat disc 6 exhibits especially favorable flow conditions. As opposed to the usual design for the lowest oil level, a smaller clearance may be maintained. This means it takes less oil to fill or longer between fill-ups of lubricating oil.

Figure 2:
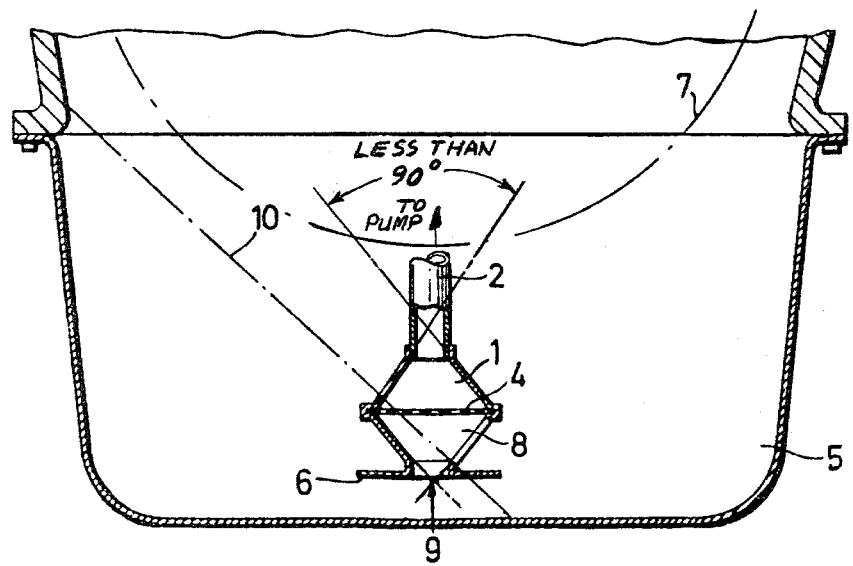
FIG. 2 shows in section a second embodiment of the pressure lubricating system according to the invention which differs from that of FIG. 1 in that the intake funnel is designed as a double cone.

FIG. 2 shows a section of an intake funnel 1 of a suction conduit 2 which leads to an oil pump (not shown). By means of a second funnel 8 which joins up with the intake funnel 1 and is arranged in reverse order thereto, the cross section of the inlet opening 9 is reduced to approximately the cross section of the suction conduit 2. The filter 4 is arranged in the plane in which both funnels 1 and 8 are connected with one another. Since the filter 4 has a flow resistance, its arrangement in the region of the largest cross section is advantageous, because compared to the inlet opening 9 and the suction conduit cross section, no noteworthy impairment of the flow occurs. A circular, flat disc 6, which affects the flow very favorably, is arranged in the plane of the inlet opening 9 to improve the flow in the area of the inlet opening 9, so that even in extreme inclined positions no air is carried forward and no foaming occurs. At the same time, the disc 6 acts with a partial emergence as a breaker against an agitated oil level. This also brings about that even with an unsteady oil level as it occurs with mobilized vehicles, an additional safety is realized against a sudden emergence of the inlet funnel 1 due to waves.

Especially favorable flow conditions together with a geometrically favorable shape result from the selected form of the intake funnel with which the angle defined by the mantle surface of the cone is less than 90° and the largest diameter of the funnel is less than five times the cross section of the suction conduit 2.

It is, of course, to be understood that the present invention is by no means limited to the specific showing of the drawing but also comprises any modifications within the scope of the appended claims.

What we claim is:

1. A pressure lubricating system for an internal combustion engine, which includes in combination: an oil pan for receiving and storing lubricating oil, a suction conduit connectable to a pump and extending into said oil pan in the central longitudinal plane of said engine and having an inlet opening at its lower end immersed into lubricating oil below the normal level of oil in said oil pan, said suction conduit for air-free suction including a slim funnel-shaped intake with its largest inside cross section amounting to only about five times that of the cross section of the suction conduit portion adjacent said funnel-shaped intake for a cross-sectional surface ratio of 1:5, said funnel-shaped intake having an inlet opening defined by an annular outer surface with a perimeter terminating in an enlarged end thereof, and a flat, disc-shaped member extending only outwardly beyond the perimeter of the outer surface of said funnel-shaped intake and having a flow stabilizing effect to assure that fewer air bubbles are taken along as well as for avoiding of air suctioning during low oil level and inclined positioning of said funnel-shaped intake to attain air-bubble-free flow, said funnel-shaped intake having an acute flat conical angle smaller than 90° for span of said disc-shaped member, the inner diameter of said disc-shaped member at least approximately equalling the greatest inner diameter of said funnel-shaped intake.

2. A pressure lubricating system for an internal combustion engine, which includes in combination: an oil pan for receiving and storing lubricating oil, a suction conduit connectable to a pump and extending into said oil pan in the central longitudinal plane of said engine and having an inlet opening at its lower end immersed into lubricating oil below the normal level of oil in said oil pan, said suction conduit for air-free suction including a slim funnel-shaped intake with its largest inside cross section amounting to only about five times that of the cross section of the suction conduit portion adjacent said funnel-shaped intake for a cross-sectional surface ratio of 1:5, said funnel-shaped intake having an inlet opening defined by an annular outer surface with a perimeter terminating in an enlarged end thereof, and a flat disc-shaped member extending only radially outwardly beyond the perimeter of the outer surface of said funnel-shaped intake and having a flow stabilizing effect to assure that fewer air bubbles are taken along as well as for avoiding of air suctioning during low oil level and inclined positioning of said funnel-shaped intake to attain air-bubble-free flow, said funnel-shaped intake including a conical section with conical angle thereof amounting to less than 90°, and a filter installed in the inlet opening to prevent absorption of coarse impurities and foreign matter.

* * * * *